Sept. 26, 1967

R. E. BEGO ETAL

BLOW PLATE ASSEMBLY

Re. 26,270

Original Filed April 3, 1963

2 Sheets-Sheet 1

INVENTORS
ROBERT E. BEGO
WILLIAM J. THOMAS
ANTHONY N. VOLTATTORNI
ATTORNEYS

BLOW PLATE ASSEMBLY

Original Filed April 3, 1963 2 Sheets-Sheet 2

INVENTORS
ROBERT E. BEGO
WILLIAM J. THOMAS
ANTHONY N. VOLTATTORNI
ATTORNEYS

United States Patent Office

Re. 26,270
Reissued Sept. 26, 1967

26,270
BLOW PLATE ASSEMBLY

Robert E. Bego, Bloomfield Hills, and William J. Thomas and Anthony N. Voltattorni, Birmingham, Mich., assignors to Progress Pattern Co., Southfield, Mich., a corporation of Michigan Original No. 3,163,894, dated Jan. 5, 1965, Ser. No. 270,425, Apr. 3, 1963. Application for reissue July 8, 1966, Ser. No. 572,167
4 Claims. (Cl. 164—200)

Matter enclosed in heavy brackets [ ] appears in the original patent but forms no part of this reissue specification; matter printed in italics indicates the additions made by reissue.

The present invention relates to an improved foundry blow plate assembly of the general type currently employed in the forming and baking of foundry cores. This procedure involves the molding in a heated core box of sand which is treated in accordance with present day practice, with a thermally settable resin compound.

For many years, foundry cores were produced by blowing oil-conditioned sand into a core box to fill and shape the core outline against a cavity or cavities in the box, after which the top member or cover of the box was removed and replaced by an aluminum drier cover of approximately the same configuration, and with its surface or cavities arranged so as to fit the still soft, formed cores from above. This assembly was then inverted, leaving the cores in the aluminum drier, which was then placed in a baking oven to set the sand cores. Baking was carried out for a lengthy period, to the extent of, say, 30 minutes. It was necessary, despite frequent re-use of the original core box components in quantity production, to have a very large number of the aluminum drier covers in stock in order to keep up with the volume of production in any given core box design.

Present day core production involves the use of a hot core box kept at about 400° F., this core box being constituted by upper and lower parts of plate-like character shaped at meeting surfaces thereof to provide the desired core forming cavity or cavities. As distinguished from the earlier practices, these parts or plates are kept in assembled relation to one another throughout both the core forming and baking phases of the operation; and in the former phase a sand especially treated with a heat setting or curing resin, such as furfural, is blown under pneumatic pressure through a blow plate assembly of one sort or another into the hot core box to fill the cavity or cavities of the latter.

The furfural sets up quite rapidly under heat, actually being capable of setting by itself somewhat above normal room temperature, for example, 100° F. Accordingly, since the blow plate assembly and any sand discharge components thereof are in direct engagement with the hot core box in the blowing operation, these parts become heated, with the result that curing or setting of the furfural commences quickly, and with the further result that the tube discharge mouth to or at the core box becomes clogged.

Thus, in one design in which a plate of the blow plate unit has blow holes communicating with openings extending an appreciable length through a removable cover of the core box, when the cover is removed after baking the partially or wholly cured sand representing said openings remains as a projection on the core. This projection has to be removed, and in breaking it away it often happens that a portion of the core is carried away, too.

It has been proposed to meet this drawback by the more or less obvious procedure of cooling the blow plate assembly by the use of cooling water. A suggested procedure was to provide a blow plate having a main cavity containing cooling water, with sleeves open to this cooling water and surrounding blow conduits. Since there was no provision to circulate the water properly, there resulted a failure to cool the sand sufficiently to prevent premature setting up of its furfural agent.

Another proposal has been to core out the blow plate and circulate water through the latter, but it is found that this still does not bring the cooling effect close enough to the hot core box to produce the desired cooling of the sand as it is blown into the box.

A further design utilizes jacketed blow tubes which extend closer to the core cavities of the core box, and which are themselves cooled by the circulation of water about their jacketed sand discharge passages. However, the blow tube structure is an intricately cast one requiring of itself much diversified coring to produce it. The same is also true of the blow plate proper of a blow plate assembly, in the event it is to be internally cooled by circulating water; and still a desiredly efficient circulatory flow for the most rapid and best transfer of heat from the blow plate is not had to date.

It is therefore a general object of the present invention to provide a blow plate assembly for core making, for use in conjunction with a separable core box adequately heated to produce the desired relatively rapid setting of the furfural agent in the sand (in, say, about 30 seconds time). The blow plate assembly includes blow tube units disposable in direct communication with the cavities of the core box, and the improvements of the blow plate assembly deal not only with means for the improved heat transfer circulation of cooling water through the blow plate proper to such tube units, but also to an improved, simplified and low cost construction of the latter for the circulation of the water locally about the individual sand discharge tube passages, again in the interest of efficient heat transfer therefrom.

More specifically, in accordance with the invention the blow plate proper is fabricated of a pair of rugged plates secured in tight face-to-face engagement, with one of said plates being routed or otherwise formed upon a surface thereof which meets the other plate to provide a sinuous passage between the plates for the efficient circulation of cooling water. Thus, internal water circulating provisions are had without the necessity of specially coring the blow plate structure.

Such provisions are, furthermore, of a nature to permit a most direct and efficient flow of water supply or intake portions or legs of the routed passage into and through the individual blow tubes, and thence directly back to return portions of the sinuous passage. A parallel, intermeshing disposition of supply and return legs of the passage means permits a most rapid circulation of the coolant, as compared with a series flow.

A substantial improvement in accordance with the invention deals, as indicated above, with the specific fabricated structure of the blow tube units, as distinguished from a cored and cast construction. These individual sand discharge sub-assemblies are each constituted by a standard internal tube of stainless steel or like stock in a desired bore size, cut to a desired length; an external jacket inexpensively produced from tubular stock by an inexpensive screw machine operation, which jacket surrounds the tube length to afford a water circulating passage about the latter; and a base adapter, standard in its external dimensions for all sizes of tube unit and also inexpensively turned as required, to which the jacket and internal sand tube are fixedly assembled.

This build-up of parts provides a blow tube subassembly of very inexpensive nature, whose standard design adapter permits a number of them to be assembled rapidly and easily in similarly standard sized, predeterminedly located openings of the lower plate unit of the blow plate proper. Their cooling action prevents an undesired premature setting up of the resin impregnated sand in the blow tube during the core forming phase.

More specifically, the adapter component of the improved below tube unit has an upper tubular extension to be received in a hole of the blow plate proper and an enlarged flange beneath this extension to fit in a counterbore of the hole, circulation of cooling water between the passage of the blow plate and that of the jacket taking place through ports in the adapter flange opening externally of the adapter. Thus, in so far as the blow tube unit is concerned, circulation is entirely within its side confines, without resort to external tubing. It follows that the tube units may be more compactly and densely assembled to the blow plate than is possible when such external circulatory means are present.

In further accordance with the invention, the jacket of the tube assembly is provided with a fairly yieldable tip of a suitable plastic, these tips being produced with different sizes and shapes of discharge openings adapted to engage the core box in direction communication with its core cavities. Thus, with the blow tube optionally produced in different sizes and designs, by a proper selection of its inner tube, outer jacket and tip, to suit the requirements of the particular core box, these parts are permanently mounted to their standard adapter, and, as thus assembled, may be mounted to any one of a number of blow plate structures having different arrangements of their discharge openings. Furthermore, a standardized blow tube unit may be removed from a blow plate having a given such arrangement and transferred to a plate having another arrangement of such openings, but standardized as to the size of the latter to also receive the transferred below tube unit.

Another object is to provide an improved combination of hot box and blow plate units, involving water circulating provisions of the sort described, with a further smoothing or baking and stripping pin unit operated coordinately with the first named units in timed relation thereto. Thus, after completion of the core forming phase, in which the blow plate assembly is brought downwardly onto the core box to communicate its blow tubes directly with and at the cavities of the latter, this assembly is lifted from the core box and shifted laterally away from the latter. The stripping pin unit or assembly is concurrently brought laterally over and then lowered toward the core box.

In accordance with the invention, the smoothing and stripping unit in question carries pins or rods located to enter the filling openings of the core box, previously occupied by the blow tubes, and to compress and smooth such small amounts of excess core sand as may have been left in these zones at the completion of forming.

The pins or rods are preferably heated to locally bake the core at the points of contact; and the blow plate, core box and baking and stripping units are coordinately operated to produce the sequence of operations described. Next, the upper plate of the core box is elevated above its lower part and relative to the stripping unit, once the furfural of the sand has partially set, leaving stripping extensions of baking pins temporarily in engagement with the core, thus to act in the manner of strippers for the core to retain it in the lower half of the core box. The stripping assembly is then itself elevated out of the top openings of the core box; whereupon the last named assembly is shifted laterally away from position above the core box.

The blow plate assembly is concurrently brought back into position above the core box, ready for another filling, forming and drying cycle; and coincident with this shuttle return of the blow plate assembly, the bottom part of the core box is dropped down in a manner to strip the completed cores from their cavities. This is assisted by strippers associated with the core box bottom.

Another object is to provide a specific improvement in an individually cooled below tube structure as described above, in which a plastic tip of the blow tube includes an elongated, somewhat flexible discharge sleeve portion. A tip of this sort may be employed when it is desired to fill a core box having openings of appreciable length in its top part communicating downwardly with its cavities. Such sleeve portion, as received with some radial clearance in an opening is capable of expanding radially under the force of discharge of sand therethrough and then, upon cessation of pneumatic pressure, of contracting radially in a manner to nip off and retain any sand left in the sleeve portion, rather than leaving this sand to project above the core cavity and thus be baked to the core.

A still further object of the invention is to provide an improved blow plate unit of extremely inexpensive construction, in which cooling water circulatory passages, as described, between two component plates of such unit may be either of straight legged supply and return portions arranged in parallel, or may have a zig-zag or other configuration suited to provide a maximum amount of cooling water in the interior of the blow plate assembly.

In any such embodiment, the construction of the unit from two parts eliminates the cost of patterns and coring involved in the production of a cast, water cooled blow plate and avoids the difficulty of sealing the pervious casting against water leakage.

The foregoing as well as other objects will become more apparent as this description proceeds, especially when considered in connection with the accompanying drawings, illustrating preferred embodiments of the invention, wherein.

Figure 2:
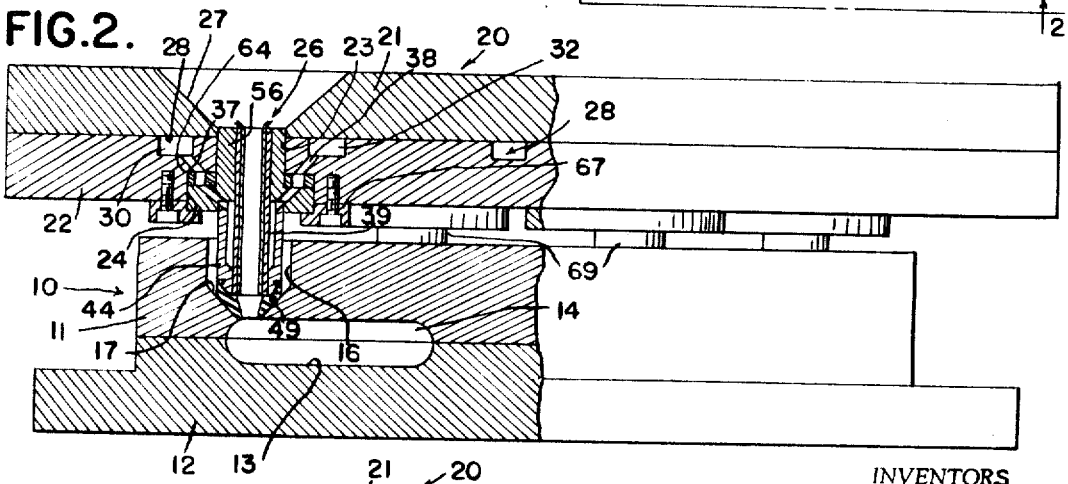
FIG. 2 is a side elevational view, partially broken away and sectioned along line 2—2 of FIG. 1, further indicating structural features of the core box and blow plate assembly, including the blow tubes of the latter.

Referring first to FIG. 2, the reference numeral 10 generally designates a two-part cast iron core box, including separable upper and lower plate-like parts 11, 12, respectively. These are respectively formed on their lower and upper surfaces to provide mating recesses 13 which conjointly constitute core forming cavities 14 when the plates 11, 12 are brought together as shown in FIG. 2. The core box 10 is externally heated to a temperature of about 400° F. by any suitable means (not shown) which will not interfere with the motions of its parts 11, 12 relative to one another, in the manner to be described.

The upper part of plate 11 of box 10 is conventionally provided with a suitable number (depending upon the number and size or design of the cavities 14), of upwardly opening filling holes 16, each shaped to provide a frusto-conical bottom seat 17 opening directly to the cavity, and flush with the top of the latter, for pneumatic pressure filling of the same with furfural treated sand.

The blow plate assembly of the invention is generally designated 20. It includes upper and lower steel plates 21, 22, respectively, bored or otherwise apertured in vertical registration with one another at points determined by and corresponding to the location of the filling holes 16 of core box 10. Thus, referring to FIGS. 1, 2 and 4, the lower plate 22 has cylindrical bores 23 and counterbores 24 for the reception of individual blow tube sub-assemblies or units, generally designated 26, of a nature hereinafter described in detail; while the upper plate 21 is formed to provide downwardly tapering frusto-conical openings 27, into the lower zone of which the blow tube assembly 26 upwardly telescopes a bit.

Actually, the blow plate assembly constitutes the base or floor panel of a sand reservoir or magazine which is from time to time replenished with sand and is kept under a sufficient pneumatic pressure during the core forming operation to discharge the sand in entrainment with a blast of air through the holes 27 into the blow tube units 26 and, as the latter are mounted to the supporting blow plate unit 20 and engaged with the core box seats 17 (FIGS. 2 and 4), directly into the cavities 14 to form cores C.

Figure 1:
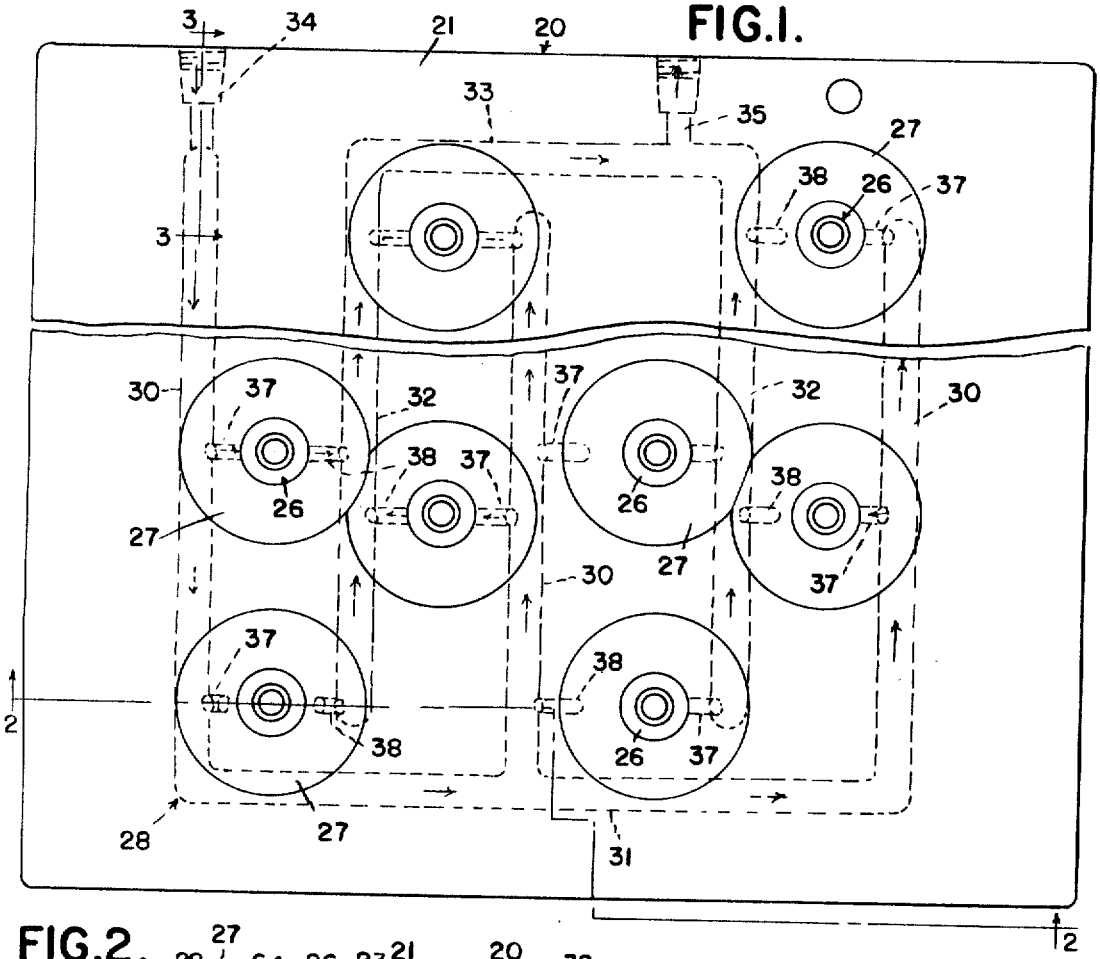
FIG. 1 is a top plan view, partially broken away, of the blow plate assembly or unit of the present invention, indicating the contouring of internal, parallel water circulatory passages in the latter, and the mode of communication of these passages with the interior of individual sand blow tubes of the assembly.

In accordance with the invention, the upper surface of bottom blow plate 22 is routed or otherwise grooved to provide water circulating passage means, generally designated 28, of the character and outline best shown in FIG. 1. Thus, for the most rapid and efficient circulation of a large volume of water to and from the various individual blow tube assemblies 26, we contemplate passaging 28 including a set of legs or passes 30 connected in parallel by a transverse pass or leg; and parallel discharge passes or legs 32 alternating with the legs 30, the legs 32 being connected to one another by a transverse leg 33.

Figure 3:
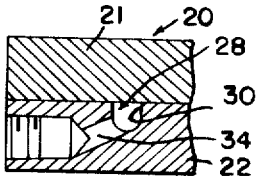
FIG. 3 is a fragmentary view in vertical section along line 3—3 of FIG. 1.

The direction of flow of coolant water in the passage means 28 is indicated by arrows in FIG. 1. One of the intake legs 30 is communicated by a port 34 (FIG. 3) through the outer side of plate 22, being there threaded to receive a suitable water supply fitting (not shown); while the transverse return pass 33 is similarly brought through the side of plate 22 by means of a tapped port 35, to which an appropriate discharge fitting (not shown) may be connected.

The various passes or legs 30, 32 described above are placed in communication with the interior of the blow tube assemblies 26 by drilled pairs of individual, radially and downwardly inclined intake and discharge ports 37, 38, respectively, the ports 37 running from the intake passage legs 30 and the ports 38 running to the discharge or return legs 32, in the fashion shown in FIG. 1. Thus there is provided a very efficient sinuous, parallel-path flow of cooling water to and from the respective blow tube sub-assemblies 26, for a most rapid and efficient removal of heat from the latter.

This efficiency is had at minimum cost of production of the steel plate assembly 20, as compared to the cost of pattern making for casting a hollow compartmented unit; and the difficulty of sealing such a casting is avoided. Economy of production of the assembly is furthered by the improved internal structural features of its sub-assemblies 26, as will be described.

Figure 12:
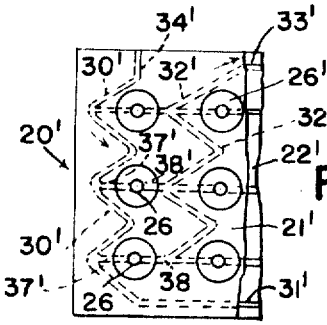
FIG. 12 is a fragmentary top plan view similar to FIG. 1, illustrating an alternative scheme of internally passaging the blow plate assembly for water cooling.

If desired, the scheme of layout of the passage means may be as shown in FIG. 12 of the drawings, wherein passage components generally corresponding to those of FIG. 1 are designated by similar reference numerals, primed. Thus, in this embodiment the passage provision is [28'] are contoured in a zig-zag outline in the interest of having a greater volume of cooling water within the blow plate assembly 20'. Otherwise port connections 37', 38' to the blow tube assemblies 26 are as shown in FIG. 1.

As thus formed, the upper and lower plates 21, 22 or 21', 22' of the respective assemblies 20 and 20' may be hydrogen brazed or otherwise bonded or secured together to constitute a sealed unitary circulatory plate structure. If desired, these plates may be appropriately gasketed and bolted together in a sealed condition.

Features of the blow tube assembly 26 are best shown in FIGS. 4 through 9. With the object of eliminating the cost of intricate coring for the casting of these water cooled units, as has been proposed, they are made, pursuant to the present invention, in their entireties of inexpensively fabricated components.

Thus each tube sub-assembly 26 includes an inner length 39 of standard stainless steel or like tubing which may, if desired, be further protected by a removable liner sleeve 40 (FIG. 4) flared or expanded at its top to retain it in place. In any event, the inner tube 39 is standard in character, being optionally formed in any desired length at the time of fabrication of the blow tube sub-assembly or unit 26.

The unit 26 also includes an external tubular jacket 44 which is turned from tubular stock, as by a screw machine operation. Jacket 44 is formed to an inner bore diameter at 45 substantially exceeding the outer diameter of the sleeve 39 and, like the latter, its axial length is chosen to suit the intended installation. An annular space 46 of substantial width and axial length is thus provided between jacket 44 and tube 39, through which space water will be circulated. A proper directional flow of circulation is insured by diametrically spaced baffles 47 subdividing space 46, which baffles may be appropriately secured to one or both of the tube and jacket components 39, 44 at the time of assembly of blow tube unit 26.

A third component of that sub-assembly is a flexible, axially apertured tip 49 of a suitable plastic resin such as "Viton," which is slightly but adequately yieldable to enable it to seat upon the frusto-conical base 17 of the filling hole 16 of core box 10. The jacket 44 is formed at 50 for the snap-on reception of the tip 49, and the latter is shaped to provide a frusto-conical bottom nose 51 to mate and seat in opening 16. Tip 49 has a central discharge opening 52, shown as tapered in FIG. 6.

Figure 4:
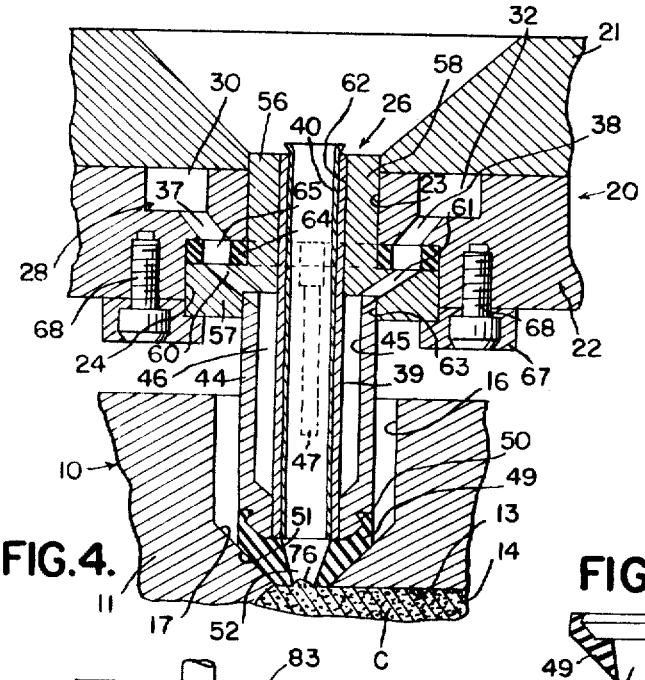
FIG. 4 is a fragmentary view in enlarged scale and in section similar to FIG. 3, more clearly illustrating structural features of the blow tube unit and showing a part of a cavity of the core box filled with sand blown into it through the tube.
Figure 5:
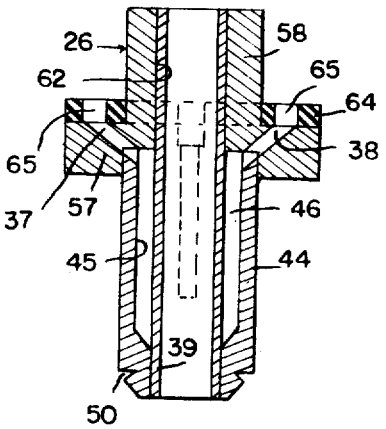
FIG. 5 is a view in section similar to FIG. 4 of the internal tube, external jacket and adapter construction of the blow tube unit or sub-assembly, per se.
Figure 6:
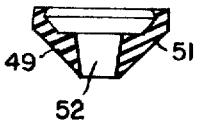
FIGS. 6 and 7 are, respectively, views in axial section through alternative designs of yieldable discharge tip adapted to be assembled to the blow tube structure of FIG. 5.
Figure 7:
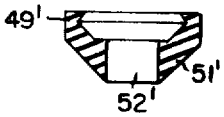

FIG. 7 illustrates one of various possible alternative modifications in shape or design of the tip, and reference numerals, primed, corresponding to those in FIGS. 4 and 6 are employed. In this instance the aperture 52' is shown as cylindrical.

Figure 9:
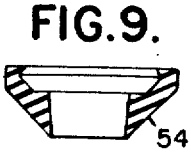
FIG. 9 is a sectional view similar to FIGS. 6 and 7 of a tip which may be applied to the unit of FIG. 8.
Figure 8:
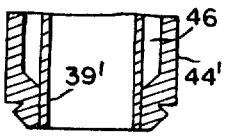
FIG. 8 is a fragmentary view in section similar to FIG. 5 of a further design of blow tube unit.

As illustrated in FIG. 8, the inner tube 39 and outer jacket 44 of the blow tube assembly may be selected in whatever diameter is desired, primed reference numerals corresponding to those of FIGS. 4 and 5 again being employed; while FIG. 9 shows a design of plastic tip, here designated 54, suitable for the dimensions of the metal parts of FIG. 8.

The blow tube unit or assembly 26 is, as best shown in FIG. 4, completed by a base adapter 56 of cold rolled steel which will be, in so far as its external peripheral dimensions are concerned, standard for all designs of tube and jacket components 39, 44, respectively. The adapter 56 has an enlarged cylindrical base flange 57 of an outer diameter to fit snugly in the counterbore 24 of bottom plate 22, and an integral upstanding cylindrical sleeve formation 58 of adapter 56 is similarly proportioned to be telescoped in the smaller bore 23 of plate 22.

A pair of radially inwardly and downwardly inclined ports 60 and 61 are drilled through the enlarged base flange 57 of adapter 56 into communication with the annular water circulating space 46 of unit 26. The bore 62 of adapter 56 is dimensioned to receive the internal tube 39, which may, as mentioned, optionally be equipped with the removable liner 40. The base 57 of the adapter is also provided with a counterbore 63 similarly receiving the jacket 44.

With the tube, jacket and adapter components 39, 44, 56, respectively, chosen as described, the jacket 44 is fitted in the adapter counterbore 63 and hydrogen brazed in place; and the tube 39 is hydrogen brazed in place in adapter 62. An apertured compressible gasket 64 is telescoped over adapter sleeve 58, and the thus constituted, pre-fabricated blow tube sub-assembly 26 is slipped into the bore 23 of lower blow plate 22, its intake and return ports 60, 61 being aligned for communication with the plate ports 37, 38, respectively, through openings 65 of gasket 64. The thus disposed blow tube assemblies 26 may be removably held fixedly in place by clamp rings 67, or the like, marginally engaging the base adapter 56 from beneath and secured by bolts 68 threaded upwardly into bottom plate 22.

Thus it is seen that the invention provides, for conjoint utilization with the special internal passage provisions 28 of blow plate assembly 20, a composite tube sub-assembly 26 of tube, jacket and adapter parts which is of very inexpensive job shop construction, yet which complements the efficiency of plate passage means 28, insuring a rapid and thorough circulation of cooling water into and out of the flange ports 60, 61 and about the blow tube 39 closely adjacent its engagement with the hot box unit or assembly 10. Thus the sand is prevented from becoming heated as it enters the hot environs of core box 10 and the possibility of its setting up to clog the blow tubes is eliminated.

The assembly of base adapter 56, blow tube element 39 and jacket 44 eliminates the cost of coring and unitary casting of the blow tube unit, as heretofore proposed, and the standardized components eliminate most of the cost and inconvenience of stocking a large number of sizes and designs of blow plate structure. They may be removed and replaced interchangeably as desired on blow plates having different arrangements of standard-sized blow holes 27. As indicated above, the readily controlled axial length of tube 39 and jacket 44 enable their projection beneath the standard adapter 56 to any extent desired. Bottom stops 69 on blow plate unit 20 may be employed for engagement with the top of core box 10 to determine the downward limit of movement of assembly 20 toward the box.

The tube unit 26 has all of its water circulating means built-in, including the flange ports 60, 61, being free of external tubing leading to and from it; which signifies that the units 26 may be very compactly assembled to the plate structure 20 to provide for a large number of blow holes on a plate of given size.

Figure 10:
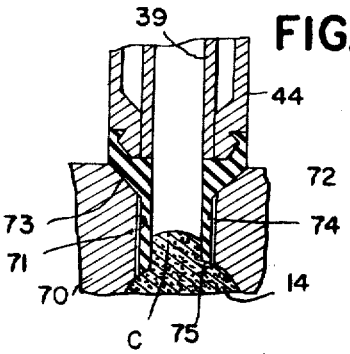
FIG. 10 is a fragmentary view in axial section through a blow tube assembly having an elongated flexible sleeve type of tip adapted to extend a substantial distance through the top part of the core box.

FIG. 10 illustrates an alternative proposed design of blow tube structure for use with a core box plate, designated 70, whose filling holes have cylindrical portions 71 extending for some length through the plate prior to communicating with the core forming cavity. Here, the jacket 44 has fitted thereto a special type of yieldable plastic tip 72. In addition to a frusto-conical shoulder 73 to engage the mating seat of the plate opening, the tip 72 is provided with an axially elongated lower sleeve portion 74 through which sand is discharged into the core box cavity. This sleeve 74 is slightly smaller in diameter than the hole portion 71 and will, under pneumatic sand discharge pressure, be radially outwardly flexed somewhat as limited by the hole. Upon relief of the pressure, sleeve 74 contracts radially to pinch off sand which would otherwise be left extending upwardly at c from the formed core C and become baked to the latter. This hump will, upon being broken off, cause defacement of the core but the tip 72 permits the excess sand c to be lifted out when the blow plate is elevated after core forming.

It is seen by reference to FIG. 10 that the tip sleeve 74 may be specially shaped at its bottom 75 to conform with the forming cavity 14, so that upon removal of the excess sand c as described the surface of the core C is left smoothly contoured.

It is seen by further reference to FIG. 4 that, upon cessation of the blowing of sand into the core box cavity 14, a small protuberance 76 of sand may be left to extend upwardly into the discharge opening 52 of the flush type tip 49 of blow tube unit 26, and that as blow plate assembly 20 and this tube unit are withdrawn upwardly, the slight protuberance 76 will ordinarily be left on the only partially set core C. However, the invention contemplates further a coordinated lateral shuttle action, along with the blow plate assembly 20, of a core smoother assembly having means to smooth out such projections or protuberances 76.

Figure 11:
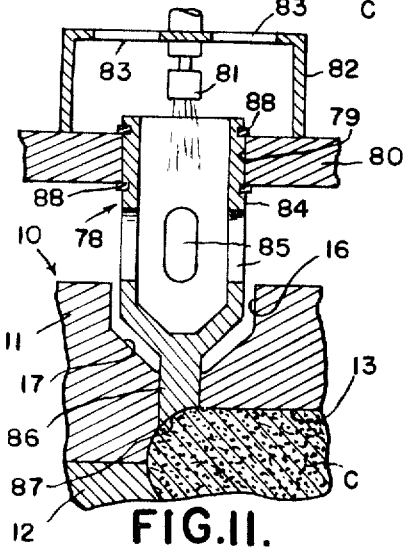
FIG. 11 is a fragmentary view in vertical section schematically showing the operation of a smoothing or baking and core stripping rod assembly in conjunction with the core box.

Although not illustrated in all details, the last named assembly comprises, as shown in FIG. 11 of the drawings, a plurality of hollow baking or smoothing and stripping rods or pins 78, one for each filling hole 16 of core box 10. These pins are mounted to depend through openings 79 of a shiftable plate 80 coordinated in action with the blow plate assembly; and the plate 80 also carries gas burners 81 of a gas manifold and burner superstructure 82 having openings 83 for secondary air. Combustion gas is supplied to the burners 81 by suitable manifold means of superstructure 82 not germane to the invention.

Each of the baking and stripper pins 78 of the plate 80 is formed to provide a hollow, upwardly opening tubular body 84 of substantial internal bore diameter for a copious reception from above of the burning gas, which exits through side openings 85 of the body. Each pin 78 carries an integral bottom stripping extension or finger 86, which is thoroughly heated by the means described. These fingers may be contoured at their bottoms 87 to fit the surface of the formed core C.

In use, following the upward withdrawal of blow plate assembly 20, the plate 80 and its smoothing, baking and stripping pins 78 are coordinately shifted to the horizontal direction, as the assembly 20 is moved laterally away, into position above the respective filling holes 16. The plate is then lowered to bring the finger extensions 86 of pins 78 into holes 16 for engagement with the top of the core C, thus flattening the small sand protuberances 76 (FIG. 4) and smoothing the core. The heating of stripping pins or rods expedites setting of the core sand at the local smoothed areas, and heat seals the same to insure against causing gas porosity in the casting.

After this corrective treatment of the core C, the upper half 11 of core box 10 is elevated, the rods or pins 78 remaining in place, so that the latter act as restraining strippers for the cores C as the core box 10 is separated. The lower half 12 of the core box 10 is then dropped away from the cores, suitable further stripper pins (not shown) which project upwardly through the box part 12 then occasioning the complete loosening of the core C, which is then appropriately removed or discharged from the core box.

The smoothing and stripping functions of the rods 78 having been served, their assembly on plate 80 is then raised sufficiently above the core box upper half 11 to permit a lateral or horizontal withdrawal of the plate 80 and rods. This is coordinated with the horizontal return of the blow plate assembly 20 into place above core box 10; whereupon the cycle of core forming, setting and removal is repeated. It is to be understood that, in the interest of high speed production, the cores C may be removed from the core box prior to the full completion of their cure or set.

Structurally speaking, the baking and stripping rods 78 carry into practice the principle of standardization which underlies the composite construction of the blow tube subassemblies 26. That is, each is produced, as by a screw machine turning, in a standard radius, being then cut to desired length according to the distance it is to depend from plate 80 for proper positioning in the core box opening 16 at the core cavity 14. As thus proportioned, the rods 78 may be held in the plate openings 79 in any suitable manner, as by the use of split snap rings 88 shown in FIG. 11.

The drawings and the foregoing specification constitute a description of the improved blow plate assembly in such full, clear, concise and exact terms as to enable any person skilled in the art to practice the invention, the scope of which is indicated by the appended claims.

What we claim as our invention is:

[1. A blow tube unit for use in conjunction with a supporting unit having at least one hole through which material is discharged in the forming of sand core and like elements, said blow tube unit being fabricated of a plurality of component parts, including an inner blow tube part, a tubular jacket part surrounding said tube part and providing a liquid circulating space about the latter, and an adapter part for mounting said tube and jacket parts to said supporting unit at said hole in the latter, said parts being secured in fixed relation to one another, the adapter part having an end portion externally proportioned for reception in said hole and an enlarged flange portion adjacent said end portion adapted to be secured directly to the supporting unit, said adapter part also having liquid supply and return passages through said flange portion opening externally thereof to communicate said circulating space in said jacket part with the interior of said supporting unit adjacent said hole of the latter.]

[2. A blow plate assembly for the forming of sand core and like elements, comprising a supporting unit having an internal liquid circulating passage and provided with holes through which material is discharged in the forming of said elements, said holes being counterbored at one end, said supporting unit having ports adjacent said respective holes which communicate with said passage of the supporting unit, and blow tube units carried by said supporting unit, each blow tube unit being fabricated of a plurality of component parts, including an inner blow tube part, a tubular jacket part surrounding said tube part and providing a liquid circulating space about the latter, and an adapter part, said parts being secured in fixed relation to one another, the adapter part having an end portion received in a counter-bored hole of the supporting unit and an enlarged flange portion adjacent said end portion received in the counterbore of said hole and secured directly to the supporting unit, said adapter part also having liquid supply and return passages through said flange portion opening externally thereof to communicate said circulating space in said jacket part with the interior of said supporting unit adjacent said hole of the latter.]

[3. A blow plate assembly for the forming of said core and like elements, comprising a pair of plates secured in liquid-tight face-to-face sealing engagement with one another to provide a plate unit, a meeting face of at least one of said plates being formed to provide therein elongated passage portions closed by the other plate to constitute an elongated liquid circulating passage between the plates, said plate unit having counterbored holes extending therethrough and at least one of said plates having ports adjacent said respective holes which communicate with said passage, and blow tube units carried by said plate unit to receive material to be formed from one side of said plate unit and to discharge said material at the opposite side of the plate unit, each of said blow tube units being fabricated of a plurality of component parts, including an inner blow tube part, a tubular jacket part surrounding said tube part and providing a liquid circulating space about the latter, and an adapter part, said parts being secured in fixed relation to one another, the adapter part having an end portion received in a counterbored hole of the plate unit and an enlarged flange portion adjacent said end portion received in the counterbore of said hole and secured directly to the plate unit, said adapter part also having liquid supply and return passages through said flange portion opening externally thereof to communicate said circulating space in said jacket part with the passage of said plate unit through the port adjacent said hole of the latter.]

[4. A blow plate assembly for the forming of sand core and like elements, comprising a pair of plates secured in liquid-tight face-to-face sealing engagement with one another to provide a plate unit, a meeting face of at least one of said plates being formed to provide therein elongated passage portions closed by the other plate to constitute an elongated liquid circulating passage between the plates, said plate unit having holes extending therethrough and at least one of said plates having ports adjacent said respective holes which communicate with said passage, and blow tube units carried by said plate unit to receive material to be formed from one side of said plate unit and to discharge said material at the opposite side of the plate unit, each of said blow tube units being fabricated of a plurality of component parts, including an inner blow tube part, a tubular jacket part surrounding said tube part and providing a liquid circulating space about the latter, and an adapter part, said parts being secured in fixed relation to one another, the adapter part having an end portion received in one of said holes of the plate unit and secured directly to the plate unit, said adapter part also having liquid supply and return passages opening externally thereof to communicate said circulating space in said jacket part with the passage of said plate unit through the port adjacent said hole of the latter, the passage of the plate unit including supply and return legs in communication with the exterior of said plate unit, and supply and return legs being arranged for a parallel flow of cooling liquid from the supply leg through the respective supply and return passages of the blow tube adapter part to the return leg of the passage of the plate unit.]

[5. A blow plate assembly for the forming of sand core and like elements, comprising a pair of plates secured in liquid-tight face-to-face sealing engagement with one another to provide a plate unit, a meeting face of at least one of said plates being formed to provide therein elongated passage portions closed by the other plate to constitute an elongated liquid circulating passage between the plates, said plate unit having counterbored holes extending therethrough and at least one of said plates having ports adjacent said respective holes which communicate with said passage, and blow tube units carried by said plate unit to receive material to be formed from one side of said plate unit and to discharge said material at the opposite side of the plate unit, each of said blow tube units being fabricated of a plurality of component parts, including an inner blow tube part, a tubular jacket part surrounding said tube part and providing a liquid circulating space about the latter, and an adapter part, said parts being secured in fixed relation to one another, the adapter part having an end portion received in a counterbored hole of the plate unit and an enlarged flange portion adjacent said end portion received in the counterbore of said hole and secured directly to the plate unit, said adapter part also having liquid supply and return passages through said flange portion opening externally thereof to communicate said circulating space in said jacket part with passage of said plate unit through the port adjacent said hole of the latter, the passage of the plate unit including supply and return legs in communication with the exterior of said plate unit, said supply and return legs being arranged for a parallel flow of cooling liquid from the supply leg through the respective supply and return passages of the blow tube adapter part to the return leg of the passage of the plate unit.]

*6. A blow-tube assembly for the forming of core and like elements, comprising a supporting unit having a pair of superposed upper and lower plates providing an internal liquid circulating space therebetween, and at least one hole opening through the bottom of the lower plate and having a counterbore at the lower end of the hole, a cylindrical blow-tube unit sized for a telescoped sliding fit in said hole counterbore, said tube unit including an inner blow-tube member from a lower end of which a discharge of core forming material takes place, the upper end of said inner member extending upwardly through said hole and through an opening in said upper plate to receive material from above the latter, a tubular jacket member distinct from said tube member and in surrounding relation thereto to enclose a liquid circulating space within the tube unit, said last named space being in communication with said circulating space of the supporting unit, and means for removably mounting said blow-tube unit to the supporting unit, as telescopingly received by the latter, comprising an enlarged flange on one of said members between the upper and lower ends of the tube unit, and means removably but fixedly engaging said supporting unit and radially overlapping said flange to hold the blow-tube unit to the supporting unit.*

*7. The blow-tube assembly of claim 6, in which said flange is on said jacket member.*

*8. The blow-tube assembly of claim 6, in which said flange is on said jacket member, in the form of an adapter part distinct from and fixedly secured to the jacket member.*

*9. The blow-plate assembly of claim 6, in which said flange has liquid supply and return passages communicating said circulating spaces of the tube unit with the internal liquid circulating space of the supporting unit.*

References Cited

The following references, cited by the Examiner, are of record in the patented file of this patent or the original patent.

UNITED STATES PATENTS

| | | | |
|---|---|---|---|
| 2,202,055 | 5/1940 | Juffa. | |
| 2,507,535 | 5/1950 | Madsen. | |
| 2,607,968 | 8/1952 | Peterson. | |
| 2,688,499 | 9/1954 | Hanson. | |
| 2,688,780 | 9/1954 | Anderson. | |
| 2,761,186 | 9/1956 | Peterson. | |
| 2,793,409 | 5/1957 | Hansberg | 22—10 |
| 2,852,818 | 9/1958 | Shallenberger et al. | |
| 2,899,725 | 8/1959 | Zink et al. | |
| 3,096,547 | 7/1963 | Hunter et al. | |

FOREIGN PATENTS

| | | |
|---|---|---|
| 306,301 | 3/1933 | Italy. |

WILLIAM J. STEPHENSON, *Primary Examiner.*